United States Patent
Kujala

(10) Patent No.: US 8,942,111 B2
(45) Date of Patent: Jan. 27, 2015

(54) NETWORK CONFIGURATION

(75) Inventor: Kimmo Kujala, Espoo (FI)

(73) Assignee: Nokia Corporation, Espoo (FI)

( * ) Notice: Subject to any disclaimer, the term of this patent is extended or adjusted under 35 U.S.C. 154(b) by 786 days.

(21) Appl. No.: 11/512,816

(22) Filed: Aug. 29, 2006

(65) Prior Publication Data

US 2008/0056150 A1    Mar. 6, 2008

(51) Int. Cl.
*H04L 12/24* (2006.01)
*H04W 24/02* (2009.01)

(52) U.S. Cl.
CPC ........... *H04W 24/02* (2013.01); *H04L 41/0873* (2013.01); *H04L 41/0883* (2013.01); *H04L 41/145* (2013.01); *H04L 41/5025* (2013.01)
USPC ............................. 370/252; 455/62; 455/560

(58) Field of Classification Search
USPC ............ 370/233, 234; 455/403, 428, 446, 62; 700/37
See application file for complete search history.

(56) References Cited

U.S. PATENT DOCUMENTS

| | | | | |
|---|---|---|---|---|
| 5,159,547 | A * | 10/1992 | Chand | 700/37 |
| 6,577,597 | B1 * | 6/2003 | Natarajan et al. | 370/232 |
| 6,829,491 | B1 * | 12/2004 | Yea et al. | 455/560 |
| 2004/0203392 | A1 * | 10/2004 | Hsu et al. | 455/62 |

FOREIGN PATENT DOCUMENTS

| | | |
|---|---|---|
| EP | 0 977 450 A2 | 2/2000 |
| GB | 2 328 581 A | 2/1999 |
| GB | 2328581 * | 2/1999 |
| WO | WO-2004/042971 A1 | 5/2004 |
| WO | WO-2006/097839 A1 | 9/2006 |

\* cited by examiner

*Primary Examiner* — Joseph Bednash
(74) *Attorney, Agent, or Firm* — Harrington & Smith

(57) ABSTRACT

Disclosed is a method for setting configuration parameters for a communication network. Performance data is periodically obtained, the performance data including information concerning performance at least in some part of said communication network. On the basis of said performance data, an appropriate set of configuration parameters is automatically chosen for at least one network element of the communication network amongst at least two predefined sets of configuration parameters. The chosen appropriate set of configuration parameters is automatically provided for use in said at least one network element, if said appropriate set is not already in use in said at least one network element.

17 Claims, 4 Drawing Sheets

```
conditions:
   (bts1.traffic > 20 OR bts1.blocking > 2)
   AND
   Bts5.traffic < 15 settings:
   bts1.power = 5
   bts1.tilt = 55
   bts5.power = 7
   bts5.tilt = 30 pre-record:
   bts.traffic
   bts.RxLev
   bts.RxQual
   bts.blocking post-record:
   bts.traffic
   bts.RxLev
   bts.RxQual
   bts.blocking
```

Fig. 3

NETWORK CONFIGURATION

FIELD OF THE INVENTION

The present invention generally relates to configuration of communication networks.

BACKGROUND OF THE INVENTION

In general, a communication network is architecturally split of into a user equipment (terminals) side and a network infrastructure side. The user equipment is the equipment used by the users of the communication network to access services of the communication network. The user equipment comprises a radio interface to the network infrastructure. The network infrastructure comprises physical network elements, which perform various functions required to terminate the radio interface and to support service requirements of the users. The infrastructure is a shared resource that provides services to a plurality of authorized end users within its coverage area.

The network infrastructure is controlled by configuration parameters that are set for every network element individually. For example, a base station may have several hundreds of configuration parameters that represent information such as base station identity, transceiver power, handover control parameters, frequency channel configuration, antenna tilt and so forth. Configuration of these parameters is determined in a network design phase (before the network is taken into use) and in network optimization phase (carried out from time to time after the network has been taken into use). The purpose of network design and optimization is to, within a defined budget, produce the best possible network infrastructure and configuration to serve network operator's business ambitions in short and medium term. A poor setting of parameters may result in poor quality of service experienced by subscribers (client's of a network operator or service provider). This in turn leads to operator's and service provider's loss of revenue through subscriber churn, call drops and blocking.

One step of the network design process is to find optimal configuration parameters for the network infrastructure. For example subscriber (end user) behavior has an impact on, what kind of configuration suits best for a particular network or a particular part of a network.

A problem in finding optimal configuration parameters arises, when subscriber behavior on a certain area tends to vary a lot, and no single network element configuration is optimal to meet all possible conditions. For example, massive outdoor events or sports events are typical examples where these kinds of problems occur. During such an event the network capacity requirements in the area can be of completely different scale than normally.

Earlier, the problem has been solved either
1) by choosing a configuration that meets the worst-case scenario, or
2) by choosing a compromise between the worst case scenario and normal situation, such that the configuration does not fully address the worst-case scenario but also does not waste network resources too much in normal conditions.

Both of these options have their drawbacks:
1) If a configuration that meets the worst-case scenario is chosen, the problem is that the network becomes over-dimensioned for normal traffic conditions. This approach quickly accumulates capital expenses (CAPEX) in the form of hardware investments when used as a common dimensioning strategy.

2) Choosing a compromise results in the problem that in the worst-case scenario the available network capacity cannot serve subscriber demand. Subscribers will experience call drops or are unable to make or receive calls. This has a direct impact on operator's revenue.

Hence, there is a need to provide new approach to handle network configuration which would avoid and/or mitigate the problems associated with the present solutions.

SUMMARY

According to a first aspect of the invention there is provided a method for setting configuration parameters for a communication network, comprising
periodically obtaining performance data, the performance data comprising information concerning performance at least in some part of said communication network;
automatically choosing, on the basis of said performance data, an appropriate set of configuration parameters for at least one network element of the communication network amongst at least two predefined sets of configuration parameters; and
automatically providing the chosen appropriate set of configuration parameters for use in said at least one network element, if said appropriate set is not already in use in said at least one network element.

Benefits of some embodiments of the invention, wherein predefined sets of configuration parameters are used, include that
the sets can be validated by experts before they are taken into use,
readily available network planning tools can be used for finding out appropriate parameters for different sets, and
inconsistencies between the parameters within a set can be avoided, because the parameters are not tuned regardless of each other.

According to an embodiment of the invention said step of choosing may be carried out on the basis of rules, wherein a rule defines certain conditions for the performance data and a corresponding set of configuration parameters, such that if said obtained performance data matches the conditions of a rule, the set of configuration parameters of that rule is chosen.

According to another embodiment of the invention there is maintained in a database information about performance and about configuration parameters, which are currently in use, for at least some network elements of the communication network, and the information maintained in the database is used for carrying out the steps of obtaining and choosing. The database may be embodied in the same apparatus, which implements the method of the first aspect, or in a separate apparatus.

According to an alternative embodiment of the invention the performance data may be obtained directly from one or more network elements of said communication network.

According to an embodiment of the invention the steps of obtaining, choosing and providing may be carried out in said at least one network element, that is, in the same network element, for which one is choosing configuration parameters.

The performance data according to various embodiments of the invention may comprise at least one of the following: base station traffic, base station blocking, received power level in a base station, quality of received signal in a base station, drop call ratio, handover fail ratio, GPRS utilization, soft handover overhead, cell availability, and link balance.

A predefined set of configuration parameters according to various embodiments of the invention may comprise at least one of the following: transmit power level for a base station, setting for antenna tilt, frequency channels, cell reselection thresholds, QoS settings, handover control parameters, and GPRS territory.

According to an embodiment of the invention validity of the predefined sets of configuration parameters has been confirmed beforehand.

Various embodiments of the invention allow the network configuration to become more dynamic and reactive to subscriber behavior. In prior art, the network planner had to either choose a single configuration to compromise for all conditions expected in the area, or create a configuration that at all times meets the infrequent worst-case scenario and wastes resources at normal conditions. By having a more dynamic configuration, performance and service quality as well as resource utilization may be improved. This may result in increased revenue and reduced CAPEX for the network operators.

According to a second aspect of the invention there is provided an apparatus comprising
a memory,
a processor coupled to the memory, the processor being configured
to periodically obtain performance data, the performance data comprising information concerning performance at least in some part of a communication network;
to automatically choose, on the basis of said performance data, an appropriate set of configuration parameters for at least one network element of the communication network amongst at least two predefined sets of configuration parameters; and
to automatically provide the chosen appropriate set of configuration parameters for use in said at least one network element, if said appropriate set is not already in use in said at least one network element.

According to an embodiment of the invention the apparatus of the second aspect is a network element of the communication network from which one obtains the performance data. A suitable network element may be for example a base transceiver station, a node-b, a base station controller or a radio network controller.

According to an embodiment of the invention the apparatus of the second aspect is embodied in a system further comprising a communication network, the communication network comprising at least one network element capable of co-operating with the apparatus of the second aspect.

According to a third aspect of the invention there is provided an apparatus for setting configuration parameters for a communication network, comprising
means for periodically obtaining performance data, the performance data comprising information concerning performance at least in some part of said communication network;
means for automatically choosing, on the basis of said performance data, an appropriate set of configuration parameters for at least one network element of the communication network amongst at least two predefined sets of configuration parameters; and
means for automatically providing the chosen appropriate set of configuration parameters for use in said at least one network element, if said appropriate set is not already in use in said at least one network element.

According to a fourth aspect of the invention there is provided a computer program stored in a computer readable medium, the computer program comprising computer executable program code adapted to cause an apparatus to implement the first aspect of the invention.

The computer executable program code of the fourth aspect may consist of program code executable by any one of the following: a multipurpose processor; a microprocessor; an application specific integrated circuit; a digital signal processor; and a master control processor.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which:
FIG. 3 shows an example of rule syntax according to an embodiment of the invention.

DETAILED SPECIFICATION

Figure 1:
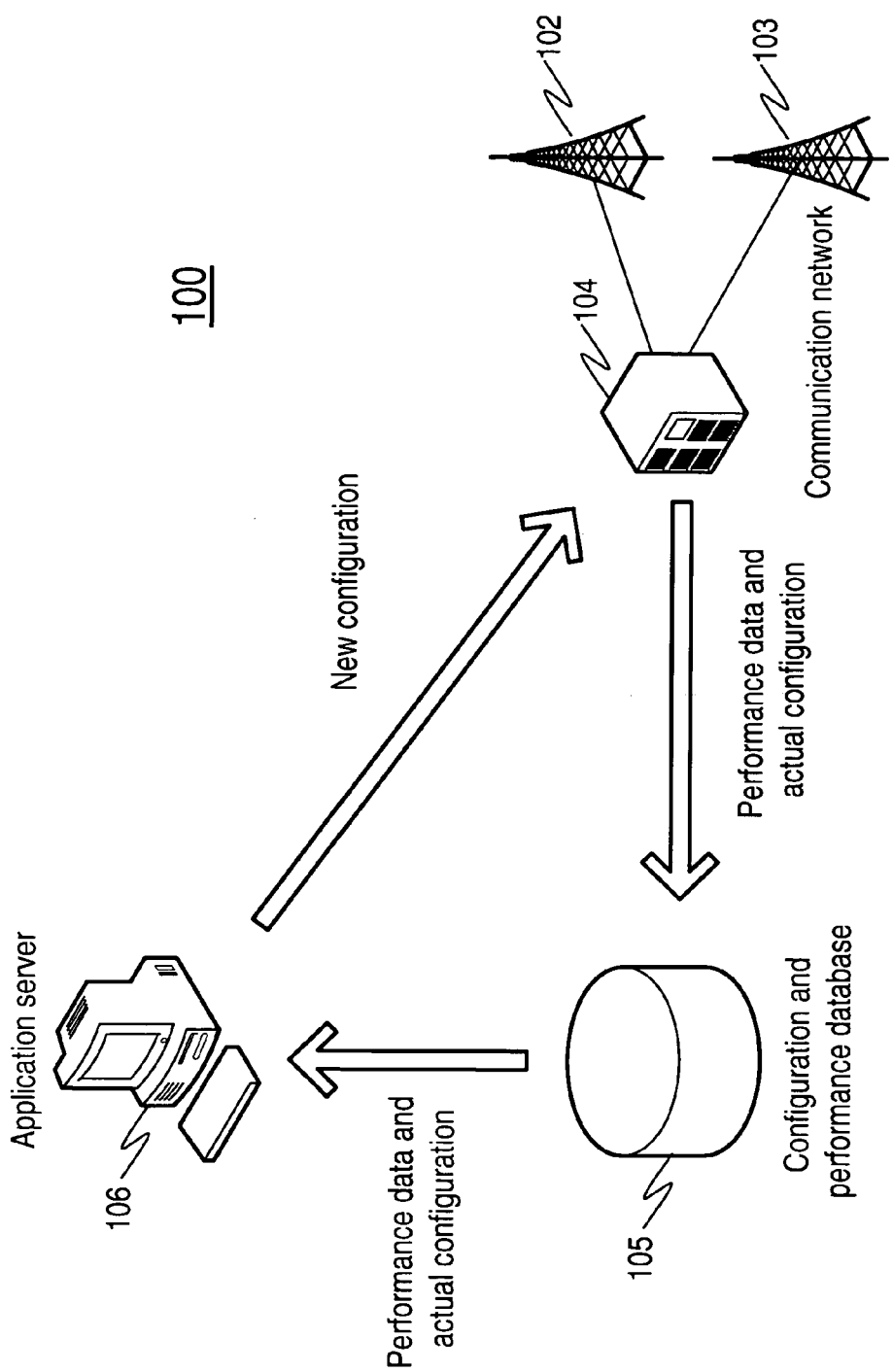
FIG. 1 shows a system according to an embodiment of the invention.

FIG. 1 shows a system 100 according to an embodiment of the invention. The system comprises a communication network, which may be any suitable communication network such as a GSM (Global System for Mobile communication), 3G (third-generation) network, UMTS (Universal Mobile Telecommunications Service), WCDMA (Wideband Code-Division Multiple Access), WLAN (Wireless Local Area Network), WiFi (Wireless Fidelity), a satellite communications network or some other communication network. The system may also comprise a number of different communication networks in which case the invention can be applied to any or all of such networks depending on implementation. The communication network comprises a base station subsystem (BSS) including base transceiver stations (BTS) 102 and 103 and a base station controller (BSC) 104. Typically the network comprises a plurality of BSSs, but here only one is depicted. Additionally the communication network may comprise various other network elements (not shown), such as a radio network controller (RNC), a home location register (HLR), a mobile switching center (MSC) and a visiting location register (VLR) for providing various services to the users (not shown) of the communication network.

Further the system of FIG. 1 comprises a database 105 and an application server 106. The database and the application server are however logical entities in the solution architecture. For the sake of clarity they are illustrated as physical entities, but in an actual implementation they need not be physical components. Instead, they may be processes running in some suitable hardware either outside the communication network 101 or inside one or more of the network elements comprised in the communication network. Furthermore the database and the application server may be located in the same physical device or in different physical devices. For example, the database and the application server may be part of a network management system. Often network management systems have one computer device hosting a database server and another computer device hosting application servers. Such arrangement is applicable for the invention, too. Another applicable option is to have a dedicated server apparatus with for example Linux operating system that hosts both the application server and the database. Yet another alternative is to have the database and the application server as processes (embedded software) running in a network element of the communication network. Such network element may be for example a network element whose configuration, directly or indirectly, has an effect on the performance of the network, such as a base transceiver station (BTS), a base station controller (BSC), radio network controller (RNC) or node-B or some other applicable network element.

Figure 2:
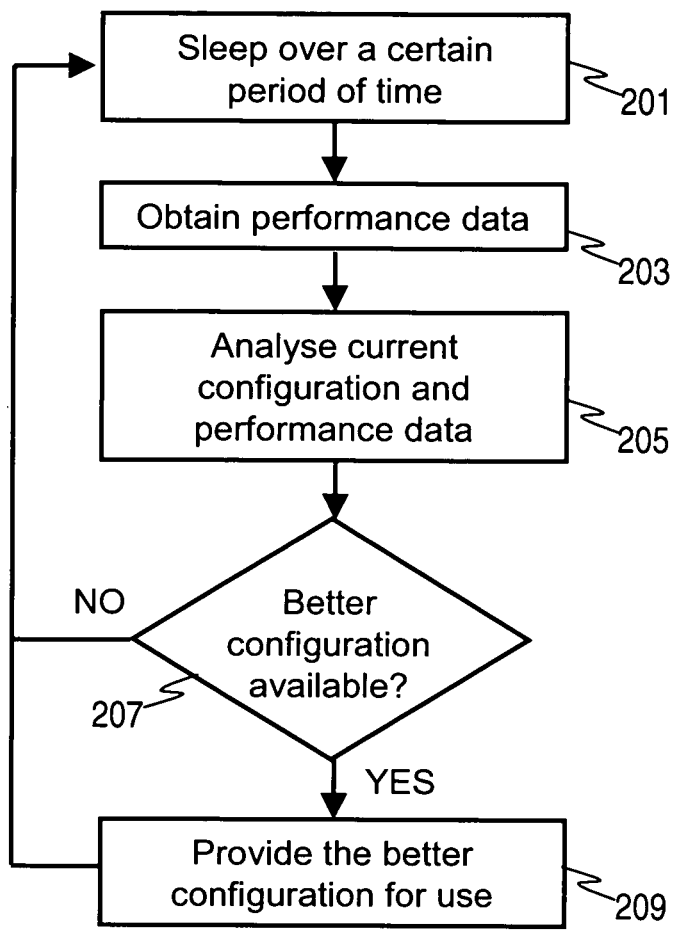
FIG. 2 shows a flow diagram according to an embodiment of the invention.

In an embodiment of the invention the application server 106 hosts a software that runs a process illustrated in FIG. 2, which shows a flow diagram according to an embodiment of the invention.

In the flow diagram of FIG. 2, the process is initially in idle state in phase 201, that is, the process "sleeps" over a certain period of time. Then in phase 203, performance data is obtained from the network. The performance data may concern performance of one or more network elements of the communication network. At minimum performance data for one network element is obtained. Possible ways to obtain the performance data are discussed in more detail below. In phase 205 of the process, the performance data is analyzed in relation to current configuration of the network. The analysis may be carried out for example by means of rules. An example of such rules is discussed below in connection with FIG. 3. In phase 207, the process continues to find out whether there is a better configuration available for the current network conditions than the configuration that is currently in use. If there is, the better suited configuration is provided for use in the network in phase 209 and after that the process returns to the idle phase 201. If it is found out in phase 207 that the currently used configuration is the one that best suits the network conditions, the process returns to the idle phase 201 directly from phase 207.

According to an embodiment of the invention the better configuration in phase 207 is searched for amongst predefined sets of configuration parameters. The predefined set of configuration parameters are dedicated network configurations defined for different scenarios. Applicable scenarios may be for example "very busy traffic" and "normal traffic". At minimum there are two sets of configuration parameters and one set of configuration parameters comprises at minimum a value for one configuration parameter. A set of configuration parameter may comprise for example any combination of the following: transmit power level for a base station, a setting for antenna tilt, frequency channels, cell reselection thresholds, QoS settings, handover control parameters, and GPRS territory.

The sets of configuration parameters are defined beforehand by a network planner and some network planning tools may be used in defining the sets. In principle the sets of configuration parameters are defined in the same way as network configuration is defined in prior art. By defining the configuration parameters beforehand as sets, the validity of the configurations that may be taken into use in the network can be confirmed beforehand. For example network planning tools and/or professional persons may verify that configuration parameters comprised in one set of parameters are not inconsistent, i.e. individual parameters are not tuned irrespective of other parameters. One more reason why a sanity check conducted by a human being is beneficial for the configuration parameter sets to be used in the network is that, if one uses an algorithm that tries to automatically tune configuration parameters, the resulting configuration parameter set may be consistent and the configuration plan valid but the configuration could still have a negative effect on performance. Provisioning such configuration into the network can cause service quality to drop unexpectedly. But since the configuration parameter sets are defined beforehand, they can be defined by professional persons from the beginning or if they are first defined by some automated tool, a professional person may conduct a sanity check for them before any configuration is provisioned into the network.

In an example implementation of the invention up-to-date performance data is maintained in the database 105 of FIG. 1. Network management systems usually have software processes that continuously collect data from the network elements and store it in a central database. Database 105 may be such central database. Also information about the configuration that is currently in use in the network may be maintained in the database 105. The application server (or some process running in the application server) may then quickly obtain the configuration and performance data by accessing the database.

As an alternative option the invention may be implemented without the use of the database. The application server may collect the performance data directly from one or more network elements of the communication network. In this case there may be more data available for the analysis and the data that is obtained is always accurate, because it is retrieved from the network on-demand.

At minimum the performance data of various implementations of the invention comprises one performance value for one network element. In practical implementations however the performance data usually comprises more than one performance value (for one or more network elements). The performance data may comprise for example any combination of the following: base station traffic, base station blocking, received power level in a base station, quality of received signal in a base station, drop call ratio, handover fail ratio, GPRS utilization, soft handover (SHO) overhead, cell availability, and link balance.

In phase 209 of FIG. 2, the better configuration may be provided for use in the network either directly to the relevant network elements or via a configuration management tool or if the invention is implemented in the relevant network element, the configuration may be provided through some internal process.

FIG. 3 shows an example of a rule syntax according to an embodiment of the invention. In general the rules determine a) upon which condition and b) how the network configuration should be changed. The rules can be stored for example in a text file or in a database tables or in some other suitable format. Additionally, it should be appreciated that the exact syntax of the rules may well be somewhat different from the shown example.

In the example of FIG. 3, the rule is stored in a text file and it comprises a conditions section and a settings section. The conditions section lists the conditions that need to be matched in order for the rule to trigger. The example rule triggers, if either BTS1 traffic is more than 20 Erl OR blocking in BTS1 is more than 2% AND BTS5 traffic is less than 15 Erl. In other words, the rule triggers, if BTS1 appears congested and BTS5 appears to have extra capacity available.

The settings section lists the configuration parameters that are to be provided for use in the network if the rule triggers. In the example, the rule instructs to set new power and tilt parameters for BTS1 and BTS5 such that some traffic from BTS1 will be pushed to BTS5.

It should be appreciated that even though the conditions and settings sections shown in FIG. 3 concern base stations, parameters of any managed object, physical or logical, may be used in those sections. Examples of applicable physical elements are: a radio network controller, a base station controller, a base transceiver station, a transceiver, an ATM (Asynchronous Transfer Mode) cross-connect, and a packet control unit. Examples of applicable logical elements are: adjacency, WCDMA cell, LAPD (Link Access Procedure D channel) link, handover path, and BCCH (Broadcast Control Channel) allocation list. Furthermore the conditions and settings sections do not need to concern the same network elements even though it may make a lot of sense in many cases.

The rule file may comprise other optional sections as well. In the example of FIG. 3 there are two optional sections for logging purposes: pre-record and post-record. Pre-record section lists those configuration and performance values that should be recorded in a log file upon this rule triggers but before the changes are sent to the network. Post-record section lists the configuration and performance values that should be recorded after the changes have been applied and the first new performance measurements become available.

It should be appreciated that in some case performance data may match more than one rule or none of the rules. In such cases for example some heuristics may be used for finding out the appropriate configuration.

It should be appreciated that in some case the rules may include checking the state of configuration parameters or network alarms in addition to performance data.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Furthermore, embodiments of the invention may be practiced in various components such as integrated circuit modules. The design of integrated circuits is a highly automated process. Complex and powerful software tools are available for converting a logic level design into a semiconductor circuit design ready to be etched and formed on a semiconductor substrate.

Figure 4:
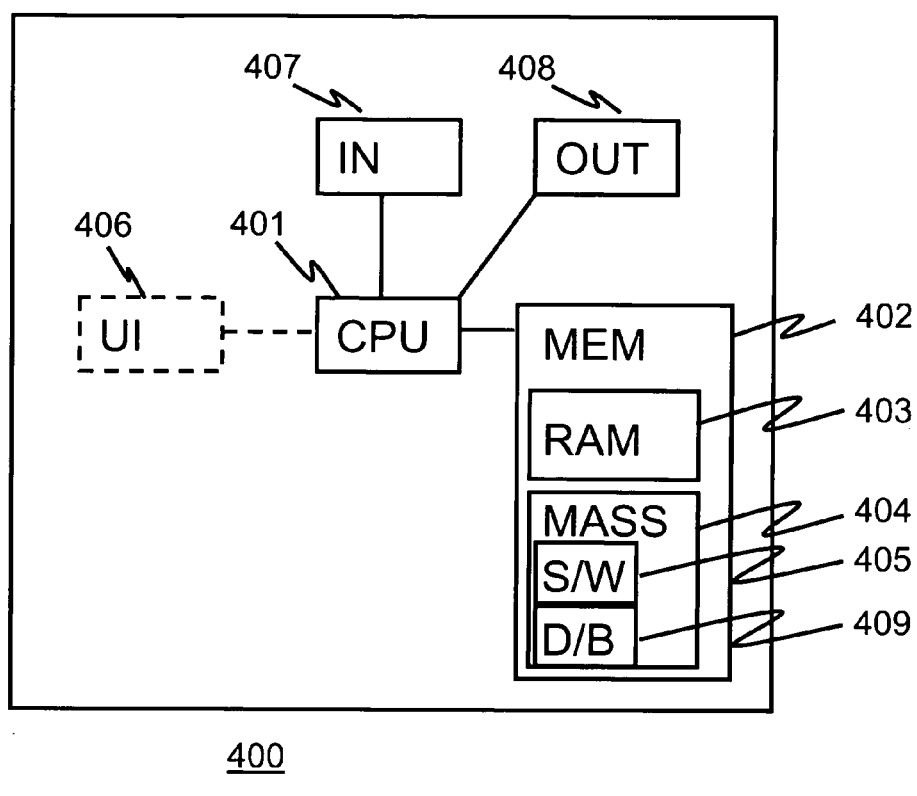
FIG. 4 shows a block diagram of an apparatus suited for carrying out various embodiments of the invention.

FIG. 4 shows a block diagram of an apparatus suited for carrying out various embodiments of the invention. The apparatus 400 is a typical computer, such as a general-purpose computer or a server, with possibly distributed functions, that comprises a Central Processing Unit (CPU) 401 for controlling the computer, a memory 402 containing Random Access Memory as a work memory 403 and containing a mass memory 404 such as a hard disk or flash RAM that is functionally non-volatile type and includes computer program code or software 405. The software 405 includes instructions for the CPU 401 to control the apparatus 400 such as an operating system and different computer applications. The software 405 may comprise instructions for controlling the apparatus to provide the functionality of the invention. The apparatus 400 further comprises a data input 407 such as a LAN or WLAN receiver and a data output 408 such as a LAN or WLAN transmitter. The input and output may be also combined together into a common unit. The apparatus 400 may further comprise a built-in or distributed database 409 as a functional part of its memory 402. The apparatus 400 could comprise also a user interface 406 (shown with dashed line), but the user interface may be implemented also by means of a remote connection through the data input and output or the user-interface may be non-existent.

It should be appreciated that in this document, words comprise, include and contain are each used as open-ended expressions with no intended exclusivity.

The foregoing description has provided by way of non-limiting examples of particular implementations and embodiments of the invention a full and informative description of the best method and apparatus presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method comprising
maintaining, in a database, information about performance and about configuration parameters, which are currently in use, for a plurality of network elements of a communication network;
entering an idle state for a period of time;
periodically and based on exiting said idle state obtaining performance data based on the information maintained in the database, by a processor, the performance data comprising information concerning performance at least in some part of the communication network;
automatically choosing, by a processor, on the basis of said performance data and based on the information maintained in the database, a set of configuration parameters for at least one network element of the communication network amongst at least two predefined sets of configuration parameters,
such that a validity for use in the communication network of each set of configuration parameters in the predefined sets of configuration parameters has been confirmed beforehand,
wherein a predefined set of configuration parameters comprises at least one of the following: transmit power level for a base station, setting for antenna tilt, frequency channels, cell reselection thresholds, QoS settings, handover control parameters, and GPRS territory,
such that choosing is performed on the basis of at least one rule,
such that a rule defines conditions for the performance data and a corresponding set of configuration parameters, such that in response to the obtained performance data matching the conditions of the rule, the set of configuration parameters corresponding to that rule is chosen;
determining whether the chosen set of configuration parameters is in use in said at least one network element;
automatically providing the chosen set of configuration parameters for use in said at least one network element, in response to determining that said set of configuration parameters is not already in use in said at least one network element; and
obtaining said performance data on demand, directly from one or more network elements of said communication network.

2. A method according to claim 1, further comprising carrying out the steps of obtaining, choosing and providing in said at least one network element.

3. A method according to claim 1, wherein said performance data comprises at least one of the following: base station traffic, base station blocking, received power level in a base station, quality of received signal in a base station, drop call ratio, handover fail ratio, GPRS utilization, soft handover overhead, cell availability, and link balance.

4. A method according to claim 1, further comprising in response to choosing the set of configuration parameters and prior to providing the chosen set of configuration parameters, recording at least one of configuration parameters and performance data.

5. A method according to claim 1, further comprising in response to providing the chosen set of configuration parameters, recording at least one of configuration parameters and performance data received after providing the chosen set of configuration parameters.

6. The method of claim 1, further comprising, in response to the obtained performance data matching conditions of a plurality of rules such that a plurality of sets of configuration parameters correspond to the rules, selecting the set of configuration parameters from amongst all sets of configuration parameters corresponding to the plurality of rules,
such that selecting the set of configuration parameters is performed using a heuristic.

7. The method of claim 1, where the validity of a set of configuration parameters ensures individual parameters within the set of configuration parameters are not inconsistent.

8. An apparatus comprising a memory that stores computer program code, a processor coupled to the memory, the processor being configured to execute the computer program code:
to maintain, in a database, information about performance and about configuration parameters, which are currently in use, for a plurality of network elements of a communication network;
to enter an idle state for a period of time;
to periodically and based on exiting said idle state obtain performance data based on the information maintained in the database, the performance data comprising information concerning performance at least in some part of the communication network;
to automatically choose, on the basis of said performance data and based on the information maintained in the database, a set of configuration parameters for at least one network element of the communication network amongst at least two predefined sets of configuration parameters,
such that a validity for use in the communication network of each set of configuration parameters in the predefined sets of configuration parameters has been confirmed beforehand,
wherein a predefined set of configuration parameters comprises at least one of the following: transmit power level for a base station, setting for antenna tilt, frequency channels, cell reselection thresholds, QoS settings, handover control parameters, and GPRS territory,
such that the processor is further configured to choose on the basis of at least one rule,
such that a rule defines certain conditions for the performance data and a corresponding set of configuration parameters, such that in response to the obtained performance data matching the conditions of the rule, the set of configuration parameters corresponding to that rule is chosen;
to determine whether the chosen set of configuration parameters is in use in said at least one network element;
to automatically provide the chosen set of configuration parameters for use in said at least one network element, in response to determining that said set is not already in use in said at least one network element; and
to obtain said performance data on demand, directly from one or more network elements of said communication network.

9. An apparatus according to claim 8, wherein the database is embodied in said apparatus.

10. An apparatus according to claim 8, wherein said performance data comprises at least one of the following: base station traffic, base station blocking, received power level in a base station, quality of received signal in a base station, drop call ratio, handover fail ratio, GPRS utilization, soft handover overhead, cell availability, and link balance.

11. An apparatus according to claim 8, embodied in a system further comprising a communication network, the communication network comprising at least one network element capable of co-operating with said apparatus.

12. An apparatus according to claim 8, wherein said apparatus is a network element of the communication network.

13. An apparatus according to claim 8, wherein said apparatus is a base transceiver station, a node-b, a base station controller or a radio network controller.

14. The apparatus of claim 8, where the at least one memory and the computer program code are further configured to cause the apparatus, in response to the obtained performance data matching conditions of a plurality of rules such that a plurality of sets of configuration parameters correspond to the rules, to select the set of configuration parameters from amongst all sets of configuration parameters corresponding to the plurality of rules,
such that selecting the set of configuration parameters is performed using a heuristic.

15. The apparatus of claim 8, wherein the validity of a set of configuration parameters ensures individual parameters within the set of configuration parameters are not inconsistent.

16. An apparatus comprising a memory including computer readable code, and a processor configured to execute the computer readable code to cause the apparatus to perform:
maintaining, in a database, information about performance and about configuration parameters, which are currently in use, for a plurality of network elements of a communication network;
entering an idle state for a period of time;
periodically and based on exiting said idle state obtaining performance data based on the information maintained in the database, the performance data comprising information concerning performance at least in some part of the communication network;
automatically choosing, on the basis of said performance data and based on the information maintained in the database, an set of configuration parameters for at least one network element of the communication network amongst at least two predefined sets of configuration parameters,
such that a validity for use in the communication network of each set of configuration parameters in the predefined sets of configuration parameters has been confirmed beforehand,
wherein a predefined set of configuration parameters comprises at least one of the following: transmit power level for a base station, setting for antenna tilt, frequency channels, cell reselection thresholds, QoS settings, handover control parameters, and GPRS territory, such that the automatically choosing is performed by choosing on the basis of at least one rule, such that a rule defines certain conditions for the performance data and a corresponding set of configuration parameters, such that in response to the obtained performance data matching the conditions of the rule, the set of configuration parameters corresponding to that rule is chosen;

determining whether the chosen set of configuration parameters is in use in said at least one network element;

automatically providing the chosen set of configuration parameters for use in said at least one network element, in response to determining that said set is not already in use in said at least one network element; and obtaining said performance data on demand, directly from one or more network elements of said communication network.

17. The apparatus of claim 16 wherein the computer readable code further comprises program code executable by any one of the following: a multipurpose processor; a microprocessor; an application specific integrated circuit; a digital signal processor; and a master control processor.

* * * * *